…

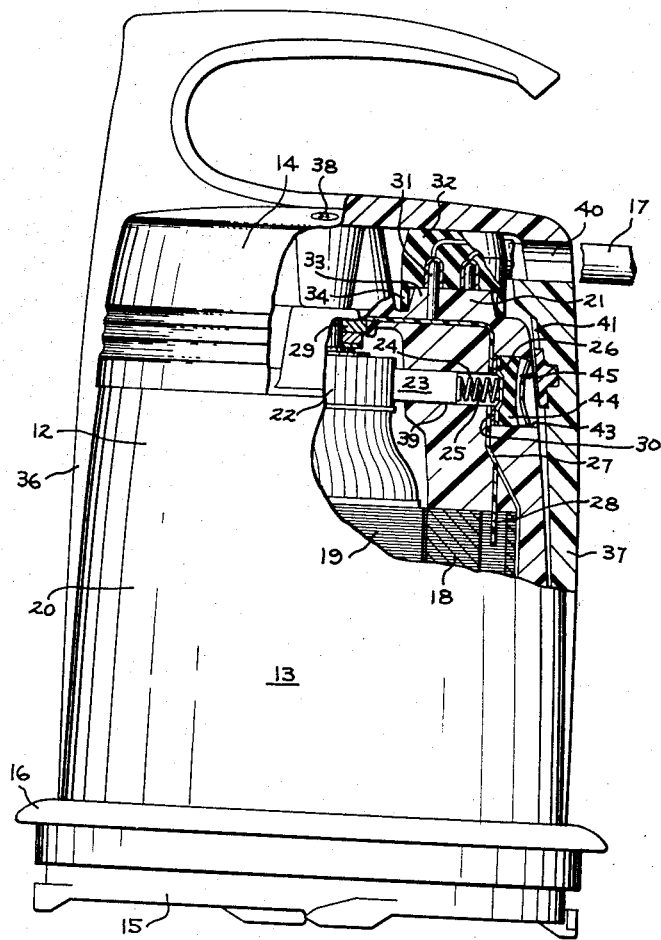

United States Patent Office 3,187,214
Patented June 1, 1965

3,187,214
BRUSH RETAINING MEANS FOR ELECTRIC
MOTOR
Bernard J. Brezosky, Louisville, Ky., assignor to General
Electric Company, a corporation of New York
Filed Sept. 14, 1962, Ser. No. 223,745
2 Claims. (Cl. 310—239)

This invention relates to electric motors and particularly to a means for securing the carbon brushes within the motor housing so as to seal the housing against the entrance of moisture around the brushes.

This invention is related to the construction of the power unit that is illustrated for the portable food waste disposer that is disclosed and claimed in U.S. Patent 3,094,291 which is assigned to the General Electric Company, the same assignee as in the present invention.

In a portable food waste disposer of the class described there are two main elements; namely, a combined hopper and comminuting chamber and a removable power unit that is capable of being fastened over the mouth of the hopper to provide the driving power for the comminuting means. The kitchen waste must be comminuted in the presence of cold water so as to obtain a flowable mixture that may be flushed into the sewer system provided for the home. Accordingly, this portable disposer is designed to be used in the kitchen sink and water is supplied continuously to the hopper during the comminuting operation. This water flowing down around the motor into the hopper constitutes a potential electrical hazard which must be given serious consideration in the design of the motor.

The conventional method of retaining electrical brushes in a motor housing is to use a complete sub-assembly consisting of machined brass brush holders and threaded plugs which are assembled behind the brushes. The present invention is particularly adapted for use with an encapsulated motor where the stator is encapsulated within a motor housing of non-magnetic material such as an epoxy resin. If the machined type of brush holder were used in this encapsulated motor, the brush holders would have to be molded into the housing and this step would be prohibitively expensive. Another solution might be that of molding threads into the brush opening by using metal plugs in the mold for the motor housing, but this would involve very close concentricity tolerances on the molding tools as well as high labor and tool maintenance costs.

A principal object of the present invention is to provide an electric motor with a simple means for holding the brushes of the motor within the motor housing so as to form a water-tight seal of the brushes without complicating the design of the motor housing.

A further object of the present invention is to provide a non-threaded retaining means for the brushes of an electric motor by using a compressible plug member and a push-in retainer so as to seal the brush opening against the entrance of moisture while retaining a simple design of brush openings in the motor housing.

Briefly stated, in accordance with one form of this invention, an electric motor such as a fractional horsepower series motor is provided with a central armature and encompassing stator that is held fixed within a motor housing. In the preferred form of this invention the motor housing is molded of a suitable non-magnetic material such as an epoxy resin and the stator is encapsulated therein, although this is not a necessity in order to practice the present invention. The armature includes a commutator as a part thereof, and the motor housing has a pair of diametrically opposed brush-receiving openings formed in the side walls thereof to be in alignment with the commutator. A carbon brush is positioned in each opening, and the brush is provided with a flexible lead that is fastened at one end to the brush and has a terminal plate fastened to its opposite end. A spring means is sandwiched between the brush and its terminal plate for urging the brush into wiping engagement with the commutator. The motor housing includes a conductive means for making electrical contact with the terminal plate for bringing current to the armature. A plug member of resilient material is positioned in the brush opening behind the terminal plate, and the plug is held in place by a push-in retainer that is wedged into the opening to be in tight-fitting engagement with the inner walls thereof. The retainer serves to compress the plug solidly within the opening so that the terminal plate is in good electrical contact with the said conductive means and the brush opening is sealed tight against the entrance of moisture.

My invention will be better understood from the following description taken in conjunction with the accompanying drawing and its scope will be pointed out in the appended claims.

FIGURE 1 is a general view in elevation on a reduced scale of a portable food waste disposer having a removable power unit for which the present invention is particularly adapted;

FIGURE 2 is an elevational view in full scale of the power unit of FIGURE 1 with parts broken away to show the method of supporting and holding the brushes of the motor in place within the motor housing;

FIGURE 3 is a fragmentary right side elevational view of the power unit of FIGURE 2 showing the cooperation between the terminal cover and the flexible electrical cord that brings power to the motor; and FIGURE 4 is a perspective view of the push-in retainer which is used in the present invention for holding a brush of the motor within the motor housing.

Turning now to a consideration of the drawing and in particular to FIGURE 1, there is shown a general view of a portable food waste disposer 10 which is of the type disclosed and claimed in the aforementioned U.S. Patent 3,094,291. This unit is formed of two separable parts; namely, a lower hopper 11 and an upper motor unit 12. The disposer 10 is to be used in the kitchen sink over the sink drain, and the kitchen faucet would be positioned so that water would be running into the hopper during the entire grinding operation. The hopper 11 not only serves as a container for the food waste, but its bottom wall is formed by a comminuting unit (not shown) which consists of a rotating flywheel that is movable within a stationary shredding ring. First, the food waste is loaded into the hopper and then the power unit 12 is fastened over the mouth of the hopper and operatively connected to a vertical shaft (not shown) that rises from the flywheel at the bottom wall of the hopper. When the power unit is energized, the food waste is propelled outwardly by centrifugal force against the shredding ring and the waste is comminuted and discharged into a sump beneath the flywheel through suitable discharge openings in the shredding ring and finally out the bottom of the hopper and into the sink drain.

A full size view of the power unit 12 is given in FIGURE 2. This power unit consists of five main elements; namely, (1) the basic motor housing 13, (2) a combined cover and handle portion 14, (3) a speed reduction gear housing 15 at the lower end of the housing which is the business end of the power unit and which housing includes a socket (not shown) for receiving the upper end of a vertical shaft from the flywheel. The next two elements are (4) a splash guide 16 in the form of a resilient annular band that is fitted into an annular groove in the gear housing 15, and (5) a flexible electrical cord 17 which is adapted to be connected at one end to the motor terminals and at its opposite end to a wall-mounted convenience outlet (not shown).

The present invention is mainly concerned with the method of retaining the brushes within the motor housing, but brief mention will be made here of the other elements of the power unit in order to facilitate the understanding of the complete assembly that has been illustrated. The motor housing 13 is shown as an encapsulated series motor which is described and claimed in the copending application of Marcus P. Hogue, Serial No. 213,685, entitled, "Encapsulated Electric Motor and Method of Making Same," which was filed on July 31, 1962, and is assigned to the General Electric Company, the assignee of the present invention. The motor includes a fixed outer stator 18 and a rotatable inner armature 19. The stator 18 is encapsulated in a molding compound such as an epoxy resin to form a molded motor housing 13 which has the form of a large inverted cup. The cup has a cylindrical side wall 20 in which the stator is located, and a top wall 21 in which is centrally located a bearing member 29 for receiving one end of a shaft extending through the armature 19. Th armature also includes a commutator 22 that cooperates with a pair of diametrically opposes carbon brush contacts 23 that are spring-biased by spring means 24 into wiping engagement with the commutator. A flexible lead 25 is connected at one end to the brush and it has at its other end a terminal plate 26. The spring 24 encircles the flexible lead 25 and is sandwiched between the terminal plate 26 and the end of the brush 23. Encapsulated along with the stator 18 in the motor housing 13 is a wiring harness 27 of insulating material that is of generally U-shape where the arms of the U are fastened to the stator as at 28 and the bight of the U is assembled over the upper motor bearing 29. This wiring harness 27 includes either printed circuit conductors or thin conductive films (not shown) which are best described in the copending application of Hogue, Serial No. 213,685, cited above. Fastened on each arm of the wiring harness is a contact member 30 which has a termination (not shown) for making connection with a lead wire from the stator winding as is well understood in this art. The explanation of this portion of the design will be left here until more explanation can be given of the remainder of the design.

The wiring harness 27 is provided with a series of three terminal pins 31 which extend outwardly from the end wall 21 of the motor housing and are adapted to receive a connector 32 that is molded on one end of the flexible three wire grounding cord 17. Attention is directed to the fact that the three terminal pins 31 are mounted in a raised boss 33, and that the connector 32 is provided with a skirt portion 34 which is adapted to fit around the boss 33 in a tight wedging action to provide a water-tight seal between the connector and the terminal pins.

It is necessary to provide the power unit 12 with a handle so that it may be easily carried from place to place, and it is also necessary to insure that the electrical conductors of the motor are properly protected against the entrance of moisture. Thus, the motor housing 13 is provided with a combined cover and handle 14 which is generally in the form of an inverted cup that fits over the upper end of the housing 13 and is provided with a pair of strap portions 36 and 37 which extend downwardly from the cup on diametrically opposite sides of the motor housing and are fitted into close fitting grooves in the motor housing for reinforcing the straps. Fastening screws 38 extend through suitable openings in the top of the cover 14 and are threaded into mating openings in the top wall 21 of the motor housing. The lower tips of the straps 36 and 37 are held in place by the annular splash guard 16 which is of resilient material and is confined within an annular groove between the speed reducer housing 15 and the motor housing 13.

Some means must be provided for allowing the entrance of the flexible cord 17 into the cover. This is complicated by the fact that each end of the cord is provided with an enlargement such as the connector 32 and a three-pronged attachment plug (not shown) at the other end which would be needed to plug into a grounded convenience outlet. The best solution was found to be the formation of the cover 14 in two parts; namely, the main cover part of the cup-shaped portion and an integral strap 36 while the second part has a separable strap member 37. The cover 14 includes a cord-receiving opening 40 where the opening is split and the separable strap 37 forms the lower portion of the opening. Actually, the cover 14 is provided with an enlarged window 41 as seen in FIGURE 3 through which the connector 32 of the cord is introduced into the cover. The separable strap 37 has an interlocking upper end so that a portion of the strap is inserted through the window and is held engaged therein to clamp the cord 17 in place.

Most of the above information has been given in order to assist in a better understanding of the environment in which the applicant's invention has found its maximum utility. Turning back to a consideration of the pair of carbon brushes 23, it is well to understand that each brush is positioned within a transverse opening 39 in the side wall 20 of the motor housing. This opening has a square transverse cross-section, and the brush 23 is of a similar shape for sliding movement therein. The outermost end of the brush opening 39 is enlarged as at 43 to permit the larger terminal plate 26 to move freely therein. Understandably the wiring harness 27 would have a suitable opening corresponding to the opening 29 for permitting the brush 23 to be inserted into the motor housing through the enlarged opening 43. Once the brush 23 is in place as shown in FIGURE 2, a plug member 44 of resilient material such as a vinyl or a synthetic rubber is assembled in the enlarged opening 43. Behind this plug is forced a push-in retainer 45 which is wedged into the opening 43 to be in tight engagement with the inner walls of the opening. This retainer 45 is forced into the opening with some force so as to solidly compress the rubber plug 44 so that the plug firmly holds the terminal plate 26 against the contact member 30 of the wiring harness thereby positioning the compression spring 24 which holds the brush 23 into wiping engagement with the commutator 22. This compression of the rubber plug 44 forms a water-tight seal for the opening so that any water pouring over the motor housing will not be allowed to enter into contact with any of the live electrical parts.

FIGURE 4 of the drawing is a perspective view of the push-in retainer 45 and it will be noticed that it is a thin clip member of generally square shape with a central opening 47 and oppositely extending side tabs 48 and 49 for making a biting engagement with the inner walls of the enlarged opening 43 of the motor housing. This retainer clip 45 has been depressed in the center so that the four corners 50 serve as spurs which actually dig into the inner walls of the opening and make it difficult if not impossible for the clip to fall out of place. The central opening 47 is of particular use in receiving a tool (not shown for forcing the withdrawal of the clip when the brushes are to be renewed or inspected.

Modifications of this invention will occur to those skilled in this art and therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. A series motor comprising an armature and a stator encapsulated in an epoxy resin to form a non-magnetic motor housing, a commutator included as a part of the armature, the motor housing having a pair of diametrically opposed brush-receiving openings formed in the side walls thereof to be in alignment with the commutator, a carbon brush positioned in each opening, spring means positioned behind each brush to urge the brush into wiping engagement with the commutator, each brush including a flexible lead and a terminal plate, said lead connected between the brush and the plate, conductor means for making electrical contact with the plate for carrying current to the armature, a plug member of resilient material positioned in each opening behind the terminal plate, and a push-in retainer forced into the opening to compress the plug solidly within the opening so that the terminal plate is in good electrical contact with the said conductor means and the opening is sealed tight against moisture by the plug, the terminal plate being in tight-fitting engagement with the inner walls of the opening so as to be held firmly in place.

2. An electric motor comprising an armature and a stator assembled in a motor housing, a commutator included as a part of the armature, the motor housing having a pair of diametrically opposed brush-receiving openings formed in the side walls thereof to be in alignment with the commutator, a carbon brush positioned in each opening, spring means positioned behind said brush to urge the brush into wiping engagement with the commutator, each brush including a flexible lead and a terminal plate, said lead connected between the brush and the plate, conductor means for making electrical contact with the plate for bringing current to the armature, a plug member of resilient material positioned in each opening behind the terminal plate, and a push-in retainer forced into the opening to be in tight-fitting engagement with the inner walls thereof so as to be held firmly in place, the retainer also serving to compress the resilient plug solidly within the opening so that the terminal plate is in good electrical contact with the said conductor means and the opening is sealed tight against moisture by the plug.

References Cited by the Examiner

UNITED STATES PATENTS

| | | | |
|---|---|---|---|
| 1,858,870 | 5/32 | Apple | 310—43 |
| 2,243,754 | 5/41 | Honegger | 220—24.5 |
| 2,372,660 | 4/45 | Coss et al. | 310—247 |
| 2,477,352 | 7/49 | Stack | 310—247 |
| 2,773,209 | 12/56 | Kirkwood | 310—247 |

FOREIGN PATENTS

| | | |
|---|---|---|
| 475,514 | 6/51 | Canada. |
| 762,022 | 6/54 | Germany. |

MILTON O. HIRSHFIELD, *Primary Examiner.*